Patented Sept. 29, 1936

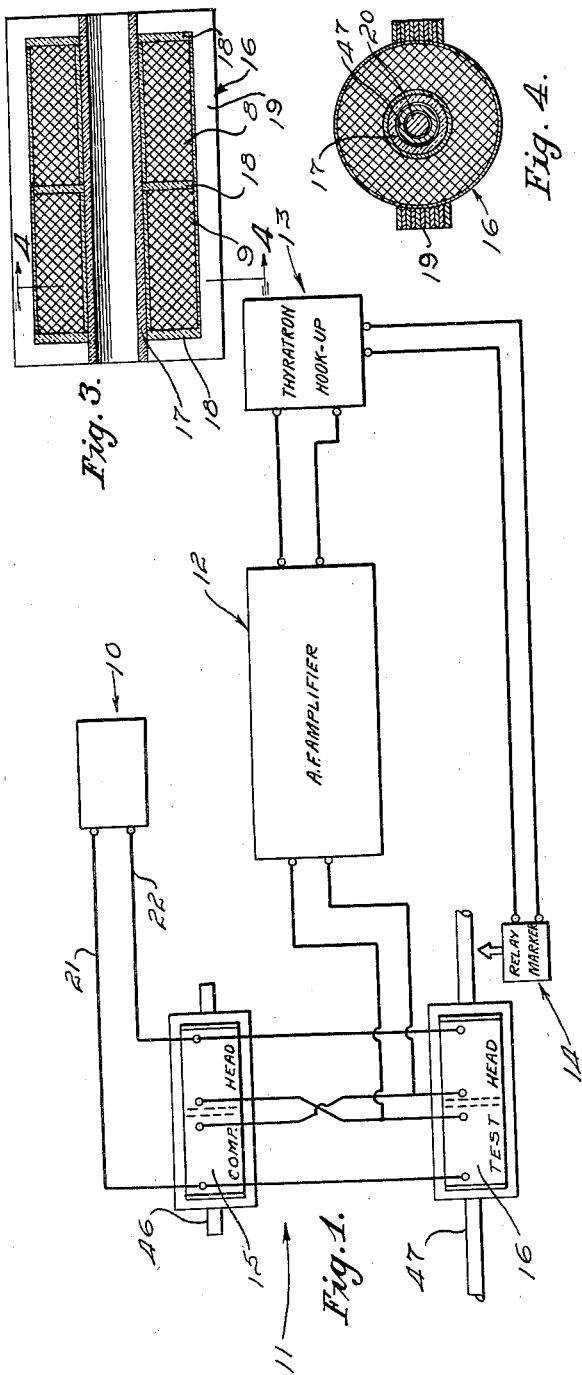

2,055,672

UNITED STATES PATENT OFFICE 2,055,672

METAL TESTING DEVICE

Harold D. Roop, Detroit, Mich.

Application October 14, 1932, Serial No. 637,811

7 Claims. (Cl. 175—183)

My invention relates to method and means for testing metallic members for flaws or imperfections and particularly to a method and means for checking conducting members for imperfections which are contained interiorly of the surface of the members and are not apparent from an external examination.

One object of my invention is to provide a method and means for detecting hidden defects in tubing and members of other rolled or drawn shape.

Defects, such as cracks, voids, faulty welding, tempering or heat treating, affect the electrical resistance and/or the magnetic permeability of metallic members and under proper conditions it was found that the resistance and/or permeability of specimen may be used to produce an external indication of its internal structure.

Accordingly, another object of my invention is to provide a method and means for utilizing the electrical resistance and/or permeability of a metallic specimen under test to produce an external indication of the internal structural make-up of the specimen.

The electrical and/or magnetic characteristics of a conductor placed in a varying magnetic field determine the amount of energy absorbed by the conductor. The amount of absorbed energy affects the voltage, current and power input to solenoids producing the magnetic field. Both the electrical resistance and the magnetic permeability will affect the amount of energy absorbed. The energy absorbed will appear as heat caused by eddy currents and hysteresis losses.

Another object of my invention is, therefore, to utilize the amount of energy absorbed by a conductor, which may or may not be of magnetic material, to give an external indication of the internal structure of the conductor, which may be the test specimen.

Another object of my invention is to provide a method and means for comparing a test specimen to a standard specimen such that any variation in the electrical and/or magnetic characteristics in the test specimen from those of the standard specimen will be instantly detected and an indication given.

Another object of my invention is to detect imperfections in articles being tested by determining the effect of current induced therein by a magnetic flux such that no electrical connection with the test specimen is necessary.

In the embodiment of my invention herein described, I affect the testing of the specimen without making a connection thereto, by employment of an inductive bridge in which the test specimen and the standard specimen are positioned in the flux path of solenoids forming arms of the bridge. If the electrical and magnetic characteristics of the test specimen and the standard specimen are substantially identical, the bridge is in balance and no indication is given. If, however, the characteristics are not the same in both specimens, a voltage, which may be amplified by suitable means, is produced across certain terminals of the inductive bridge.

Accordingly, another object of my invention is to provide an inductive bridge by which the electrical and magnetic characteristics, and therefore the structure of test specimen, may be compared with that of a standard specimen.

A still further object of my invention is to provide a device through which a relatively long test specimen may be passed while being checked inductively against a standard specimen in combination with a device for producing a mark or indication upon such test specimen at the point where indications show a defect to be present.

Other objects and features of novelty of my invention will be either specifically pointed out or will become apparent when referring, for a better understanding of my invention, to the following description in conjunction with the accompanying drawing, wherein:

Figure 1 is a schematic view of apparatus and conductors interconnected to form a device embodying my invention, Fig. 2 is wiring diagram showing the complete electrical connection of the structure illustrated in Fig. 1, Fig. 3 is a sectional view of a test or comparative head, employed in the structure illustrated in Fig. 1, and Fig. 4 is a sectional view of the structure illustrated in Fig. 3 taken on the line 4—4 thereof.

Referring more particularly to Fig. 1, my invention comprises in general, a source of alternating current 10 connected to the testing inductive bridge 11 which is connected to an audio frequency amplifier 12 for amplifying the voltage present across the output terminals of the bridge. A Thyratron hookup or circuit 13 is connected to the output end of the amplifier 12 by means of which the amplified voltage delivered from the amplifier is enabled to control sufficient power to operate a relay marker 14 or other device.

The inductive bridge 11 is preferably composed of four windings or solenoids which are indicated by numerals 6, 7, 8 and 9 and are preferably interconnected as shown in Figs. 1 and 2.

The two solenoids 6 and 7 are positioned adjacent to each other to form a comparative head 15 while the two other solenoids 8 and 9 form the test head 16. These two heads, that is to say the comparative head and the test head, are similar in construction and only one will be described in detail.

As illustrated in Fig. 3, the head comprises a tube 17 of insulating and wear resisting material upon which are mounted the coils 6 and 7, or 8 and 9, as the case may be, separated by an insulating washer 18 which is similar to the end washers 18 which retain the coils in predetermined relation on the tube. A magnetic circuit 19, which is preferably made of laminated sheet material, encompasses the coil for providing a flux path of low reluctance about the coil. In Fig. 4, I have illustrated the test head as being arranged for testing a non-magnetic tubular specimen of conducting material and have shown an iron core 20 disposed within the hollow interior of the specimen.

The preferred electrical connection of the inductive bridge is shown in Fig. 2 wherein solenoids 6 and 9 are connected in series across the conductors 21 and 22 leading from the source of power 10. The solenoids 8 and 7 are in like manner connected in series across the same pair of conductors 21 and 22. In this manner, a coil of one head is connected in series with a coil of the other head. A resistance 23 may be inserted between the outside terminals of coils 6 and 8 so that the circuit through the conductor 21 may be completed through a movable contact 24. This resistance makes it possible to adjust the total resistance of the arms which go to make up the inductive bridge so that the bridge may be brought to a condition of balance in case the resistance of the windings or solenoids are not exactly equal.

The source 10, which supplies power to the inductive bridge, may be merely a transformer as shown in Fig. 2, having a primary 25 connected to an alternating current source of power, such as a conventional 60 cycle alternating current power line, and provided with a secondary 26 which is connected to the conductors 21 and 22. The source 10 may, when desired, be a conventional 1000 cycle oscillator commonly used for alternating current bridges. Other frequencies may be used and the frequency selected in any particular case would depend upon the power available and the nature of the work being tested. If desired, a pulsation of direct current may be employed, obtained, for example, by closing and opening a contact device in a direct current power source connected to the conductors 21 and 22.

A conductor 27 connects the inner terminals of solenoids 8 and 7 to one terminal of the primary 28 of an input radio frequency transformer 28 and a second conductor 29 connects the inner terminals of the solenoids 6 and 9 to the other terminal of the primary of the transformer. When the voltage across the solenoid 6 is exactly similar to the voltage across the solenoid 8, in value and phase, no voltage will be impressed across conductors 27 and 29, but if this condition does not exist, a voltage will be impressed across the conductors. This voltage may be amplified to any desired degree by the audio-frequency amplifier 12 conventionally shown in Fig. 2.

The amplifier is illustrated as including two vacuum tubes 30 of the well known radio type and it is to be understood that a greater or less number of tubes and connections other than those shown may be used depending upon the conditions under which the device is operated. An output transformer 31 is provided for the amplifier 12, the secondary of which contains a central tap 32 connected to the grid 33 of a Thyratron tube 34 through a conductor 35 and a relatively high resistor 36. By a Thyratron tube I mean a device incorporating a central electrode or grid, which passes current in accordance with the load demand although actuated to pass such current by a slight change in a minute quantity of energy. The outer terminals of the secondary are connected to the plates of a rectifying tube 37, the filament current of which is supplied by a secondary 38 of a power transformer 39, the primary of which may be connected to a 60 cycle A. C. power supply. A tap 40 on a secondary 38 is connected by the conductor 41 to the plate on the Thyratron tube 34. An alternating or pulsating voltage across the conductors 27 and 29 will be amplified and rectified to a D. C. voltage and impressed across the grid and plate of the Thyratron tube 34 by the conductors 35 and 41.

The D. C. voltage impressed across the Thyratron is a measure of the alternating current voltage across the conductors 27 and 29, and this voltage may be used to give a visible indication of the condition within the inductive bridge by means of the voltmeter 42 connected between conductors 35 and 41.

The plate current of the Thyratron tube 34 is furnished by another secondary 43 of the transformer 39 and a solenoid 44 of the relay marker 14 is included in the plate circuit of the Thyratron tube and through the cathode of the tube. It will be understood that the D. C. voltage impressed on the grid of the Thyratron tube will control the flow of current across the plate and cathode circuit of the tube. That is to say when the test specimen varies a sufficient degree from the standard in physical construction, a difference in potential between the grid and cathode of the Thyratron tube will be sufficient to ionize the path therebetween and permit current to flow between the plate and cathode from the source 43 in an amount in accordance with the load demand. This current will persist only so long as the grid potential remains above the predetermined amount and until the cycle of A. C. current in the load circuit reaches zero thereafter. By the arrangement illustrated, a very small voltage across the conductors 27 and 29 can be made to control a large amount of power through the plate and cathode circuit of the Thyratron.

The exact construction of the relay marker 14 forms no part of the present invention, it being merely necessary to provide a device which will project a crayon or other marking element against a specimen being tested or which will spray a small amount of paint upon the specimen when a circuit is completed by the Thyratron tube.

In operation, a standard specimen 46 is placed within the comparative head 15 and a specimen 47 to be tested is passed through the test head 16. If the specimens to be tested are of magnetic material, no supplemental core 20 will be required. On the other hand, as indicated in Fig. 4, when non-magnetic tubing of conducting material is being tested, a magnetic core 20 is inserted within the tubing. This core may be held stationary in the test head by suitable means (not shown) and the tube moved between the head and core, or the core may be the same length of the tubing and passed through the test head along therewith. Various means may be employed for holding the core 20 within the test head. One such means would include a winding disposed about the tube to be tested and independent of the test head, the flux of which would secure an armature within the confines of the winding. This armature would be connected to the core 20 by a non-magnetic or insulating coupling element and would thereby retain the core positioned within the head. It is to be understood that it is not necessary to move the material being tested, since a short piece may be inserted within the test head and left stationary while being compared with the standard specimen in the comparative head.

The current flowing in the solenoids forming the bridge 11 will set up a magneto-motive force, producing a flow of magnetic flux through the respective heads axially thereof. When the current is a changing current, such as produced by an alternating current circuit, the flux to the solenoids will also change at the frequency of the current. When a specimen of conducting material such as a tube is placed within the solenoid, a voltage will be induced therein by the changing flux cutting the conducting material, as is well known, and currents will flow in the tube in a direction circumferentially of the tube as a result of this induced voltage.

The amount of flux produced in the solenoid is a function of the permeability of the substance therewithin and may be increased by the introduction of the iron core 20 of high permeability and if the specimen to be tested is made of a material having a high permeability, no supplemental iron core is necessary.

The current flowing circumferentially of the test specimen will of itself produce a magneto-motive force which will cause a flow of flux through the solenoids. The flux will of course cut the conductors of the solenoids and will modify the voltage thereacross. The amount of current depends upon the resistance of the specimens and a defect, for example a longitudinal crack in the test specimen, will increase the resistance of the specimen tested to such an extent that the circumferential current and the flux resulting therefrom will be reduced, effecting a change in the voltage across the solenoids. The difference between the voltage in the coils 6 and 9 and 8 and 7 is the voltage across the conductors 27 and 29 which is available, when of sufficient magnitude, to actuate the indicating mechanism of the inductive bridge. This voltage is a function of the difference in resistance between the test specimen and the comparative specimen and is a measure of the size and extent of the flaw in the test specimen.

When a solid piece of non-magnetic material is to be tested or when a tubular piece of material is to be tested without employing a core 20, such tests may be successfully made in the device herein described. The frequency of the alternating cycle of the source of power is increased to such a degree as to set up eddy currents in the non-magnetic material. Such currents will modify the voltage in the solenoids 8 and 9 in the test head in the same manner as when magnetic material is being tested on a low frequency source of power, with the resulting indication as hereinabove described.

While we have been referring to the increase of electrical resistance in the test specimen due to flaws and the means for indicating the presence of such flaws, it is to be understood that the device is just as effective to note points of decreased resistance which would also produce a difference of potential between the output conductors 27 and 29.

With my particular solenoid arrangement illustrated, it is immaterial whether the flaw is positioned in the solenoid 8 or the solenoid 9. It follows that a voltage will persist across conductors 27 and 29 as long as a flaw remains in the test head. A further advantage resides in the fact that the effect of flaws positioned in both the solenoids 8 and 9 will be additive and a single long defect in both of the solenoids will produce a greater voltage across conductors 27 and 29 than a shorter flaw in either solenoid. This is one of the very important advantages embodied in the present invention, and the apparatus illustrated in the figures produces a superiority of measurement never attained heretofore.

From actual operation of the bridge as illustrated in the figures, the test specimens have been checked with standard specimens to have the hidden flaws of the test specimens accurately located. The test shows that the bridge may be employed to detect very small differences in the diameter of a steel and iron rod as well as to detect the flaws in such members. That is to say when the metals are uniform the cross section variation will readily be indicated by my device. The device is not limited to tests or inspecting rods or tubing but any uniform metallic form may be compared. Railroad rails would be an example of a specimen which could readily be tested in my device, as well as any similar uniform or commercial form of metal of uniform surface.

I wish further to point out that my device is not limited to elements of uniform section since comparison can be obtained between a standard and a test specimen of similar section which is non-uniform when both are similarly placed in the comparative and test heads respectively. In case no flaws exist in the test specimen, no voltage would be produced across the output terminals. When, however, the test specimen does not have the same resistance and permeability as a result of flaws therein, the voltage would appear across the opposite terminals of the bridge and an indication would be given of flaws. Accordingly, the invention is applicable to a form of non-uniform section.

I wish to further point out that once the test specimen is found to compare favorable with the standard specimen, it may be checked after heat treatment with a standard heat treated specimen to check for faulty heat treatment, since variations in heat treatment varies the resistance and permeability of the metal of which the test specimen is composed, as is well known.

While I have described and illustrated but a single embodiment of my invention, it will be apparent to those skilled in the art that various changes, omissions, additions and substitutions may be made therein without departing from the spirit and scope of my invention as set forth in the accompanying claims.

I claim as my invention:

1. A device for locating defects in articles of conducting material including, in combination, a test head and a comparative head each of which is provided with two similar mutually inductive windings, one winding of each head being connected to an opposite winding and to a remote winding of the other head, and means for indicating any difference in potential across said remote connections.

2. A device for locating defects in articles of conducting material including, in combination, a test head and a comparative head, each of which is provided with two similar mutually inductive windings, one winding of each head being connected to an opposite winding and to a remote winding of the other head, a pulsating circuit joined to said opposite connections for inducing a current in the article and a standard specimen disposed, respectively, in said heads, and means for indicating any difference in potential across said remote connections in the presence of dissimilarity in the article and specimen, the induced current in which affects the windings.

3. A device for comparing a specimen with a standard specimen including, in combination, a test head and a comparative head each of which is provided with two similar mutually inductive windings, one winding of each head being connected to an opposite winding and to a remote winding of the other head, a pulsating circuit joined to said opposite connections when a specimen to be compared and a standard specimen is disposed in said heads, respectively, and means for noting any difference in potential across said remote connections.

4. A device for detecting defects in an article of conducting material including, in combination, a test head comprising two windings positioned relative to each other, and in axial alignment for receiving the article, a comparative head of similar construction for receiving a standard specimen, each of said windings of one head forming a series circuit with differently positioned windings of the other head, the two series circuits being connected in parallel, means to impress a varying voltage across said series circuits, and means to detect a difference in voltage across the windings of the different heads at the point of series connections.

5. A device for comparing an article of metallic material with a standard specimen to detect flaws in said article including, in combination, two windings forming a first series circuit and two windings forming a second series circuit, said series circuits being connected in parallel, a winding of the first series circuit being positioned adjacent to and mutually inductive with a winding of the second circuit to form a test head, the other winding of the first circuit being positioned adjacent to and mutually inductive with the other winding of the other circuit to form a comparative head, said test head to receive said article, and said comparative head to receive a standard specimen, a pulsating circuit connected to said series windings, and means actuated by a difference in the energy absorbed by said article and said standard specimen in the presence of a flaw in said article for effecting a visible indication of the presence of said flaw.

6. A device for testing the magnetic permeability of a specimen with a standard specimen including a test solenoid and a comparative solenoid each provided with two similar windings, the magnetic flux of said test solenoid cutting said specimen and the magnetic flux of said comparative solenoid cutting said standard specimen, said four windings being interconnected to form a Wheatstone bridge, the windings which form opposite arms of said bridge being mutually inductive windings on the same head, means for causing potential difference between one pair of opposite terminals of said bridge and indicating means responsive to potential difference connected to the other pair of opposite terminals of said bridge.

7. A device for testing a specimen with a standard specimen including a test solenoid and a comparative solenoid each provided with two similar windings, the magnetic flux of said test solenoid cutting said first specimen and the magnetic flux of said comparative solenoid cutting said standard specimen, said four windings being interconnected to form a Wheatstone bridge, the windings which form opposite arms of said bridge being mutually inductive windings on the same head, means for impressing a high frequency alternating potential across one pair of opposite terminals of said bridge, thereby causing eddy currents in said specimens, and indicating means connected to the other pair of opposite terminals of said bridge and responsive to potential difference between said other pair of terminals.

HAROLD D. ROOP.